Sept. 25, 1962    J. F. MARCH    3,055,108
SHRUB SHEARS

Filed Sept. 29, 1959    2 Sheets-Sheet 1

INVENTOR.
JOSEPH F. MARCH
BY
*Lindsey and Prutzman*
ATTORNEYS

Sept. 25, 1962

J. F. MARCH 3,055,108

SHRUB SHEARS

Filed Sept. 29, 1959

INVENTOR.
JOSEPH F. MARCH
BY
Lindsey and Prutzman
ATTORNEYS

United States Patent Office 3,055,108
Patented Sept. 25, 1962

---

3,055,108
SHRUB SHEARS
Joseph F. March, Waterbury, Conn., assignor to The Stanley Works, New Britain, Conn., a corporation of Connecticut
Filed Sept. 29, 1959, Ser. No. 843,131
2 Claims. (Cl. 30—257)

This invention relates to shrub shears of the type having a pair of pivoted crossed blade members having handles secured on the rear ends thereof.

The aim of the invention is to provide improved shrub shears of this type having various features of novelty and advantage and wherein the blades are so formed as to develop a constant pressure between the cutting edges of the blades throughout the closing movement thereof, and thereby provide a smooth action and practically avoid jamming of the branches, twigs or stems operated upon between the blades; wherein the blades are so pivoted as to impart a slicing action which reduces the energy needed to make a cut; wherein the blades when in the same are in open position provide a gathering area which more effectively gathers the materials to be cut, keeps them from escaping from cutting action and increases the capacity of the shear at this point; and wherein any branch, twig or single stem disposed in the gathering area rearwardly of a cutting notch provided in one of the blades is, on initial closing movement of the blades, automatically guided into the cutting notch.

A further aim of the invention is to provide improved means for securely connecting the wooden handles to the butt ends of the blades in such a manner as to prevent loosening of the handles and also prevent chewing or maceration of the wood.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
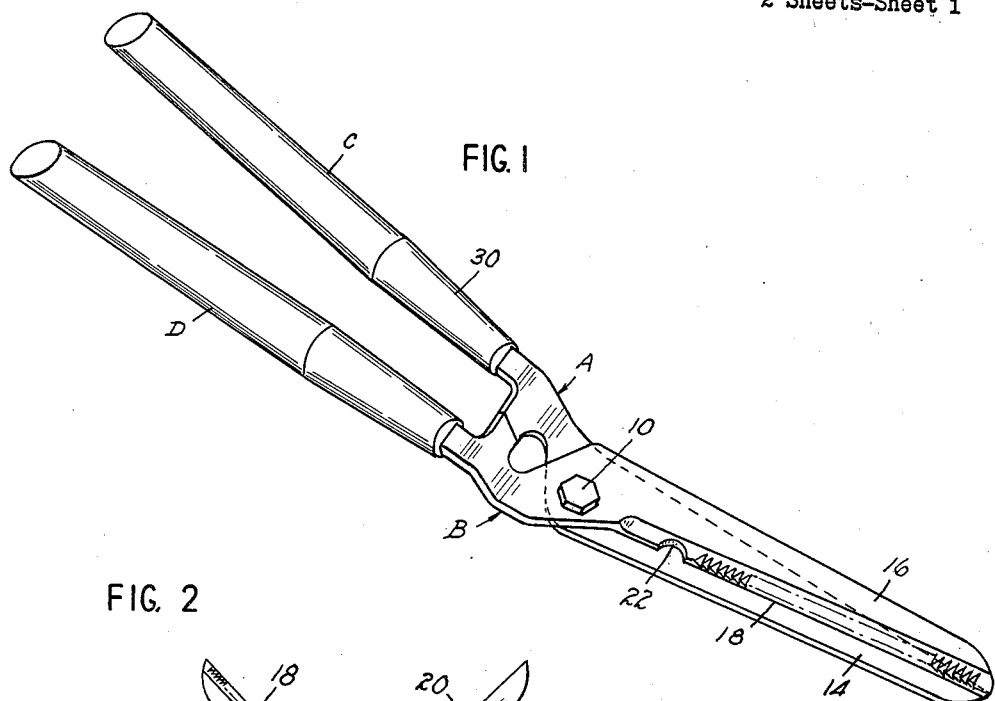
FIG. 1 is a perspective view of a shrub shears embodying the present invention with the blades in closed position.

Referring to the embodiment of the invention shown in the drawing, the shrub shears comprises two cross blade members A and B connected by means of a pivot 10 which is in the form of a bolt having a nut 12. Wooden handles C and D are respectively secured to the butt or rear ends of the blade members. The handles in effect consititute contaminations of the blade members, the handles being in a plane disposed at a slight upward angle to the general plane of the blades 14 and 16 of the respective members A and B.

The top blade 16 has a cutting edge 18 and the under surface of this blade is planar throughout. The bottom blade 14 is transversely curved so that the upper surface thereof is transversely concave along an axis spaced and diverging from the cutting edge 20. The bottom blade 14 is also slightly and gradually curved upwardly along its longitudinal axis as it progresses towards its outer end. With this arrangement, the blade has a twist and the cutting edge 20 continuously and gradually rises as it progresses forwardly to the point of the blade so that as the cutting edge 18 of the top blade 16 runs along the ever-rising cutting edge 20 of the bottom blade 14 a constant pressure is developed between the blades during the cutting action. During a cutting action the bottom blade 14 presents a cutting edge 20 ever present ahead of the precise point of contact of the cutting edges, and behind lies a clearance provided by the concavity of the blade so that the cut at the moment of severance is clean, crisp, and without cause for jamming or "pulling-in."

Figure 7:
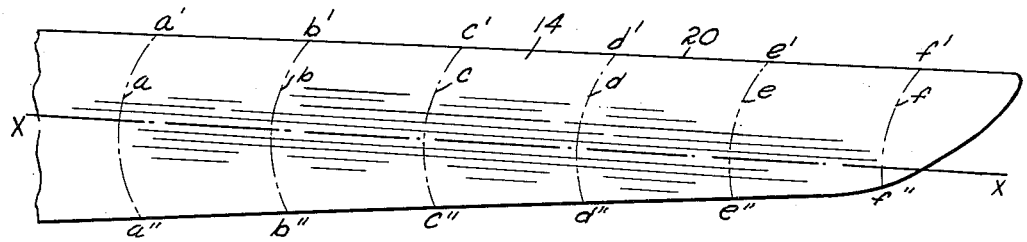
FIG. 7 is a top plan view of the forward end of the portion of the bottom blade illustrating diagrammatically the transverse concave contour of the upper surface thereof.
Figure 8:
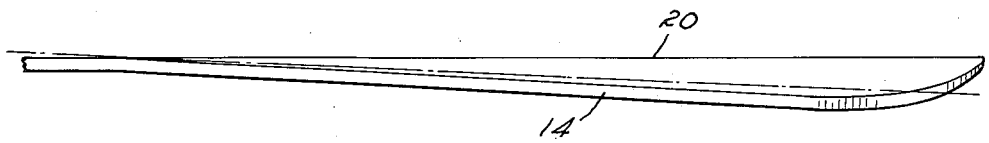
FIG. 8 is an elevational view of the bottom blade looking toward the rear edge thereof.

The construction of the lower blade may be more easily understood by reference to FIGURES 7 and 8 of the drawings. The transverse concave contour longitudinally follows the line x—x which is spaced from the cutting edge 18 and diverges outwardly from the pivot end. This line is disposed not along the longitudinal center of the blade but at an angle thereto. The curved lines a, b, c, etc., indicate the transverse curvature of the blade at different points of the length thereof. These lines a, b, c, etc., are shown as being in the plane of the paper for convenience, it being understood that in the actual blade these lines indicate sections taken transversely and vertically through the blade. FIGURE 8 illustrates the forwardly and upwardly slight curvature of the blade in a longitudinal direction and also clearly illustrates the ever-rising character of the cutting edge 18. It is clear that the points a', b', c', etc., along the edge 18 of the blade are progressively higher than the coresponding points a'', b'', c'', etc., along the outside or rear edge of the blade.

Figure 2:
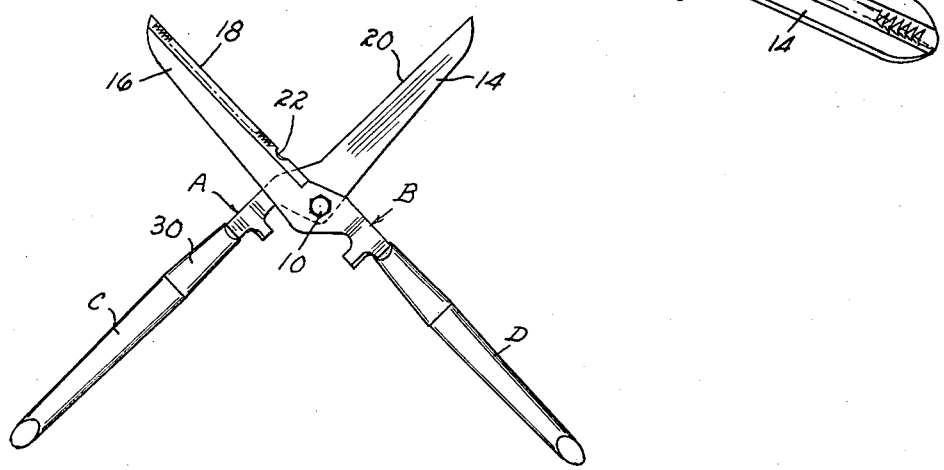
FIG. 2 is a top plan view thereof with the blades in open position.
Figure 3:
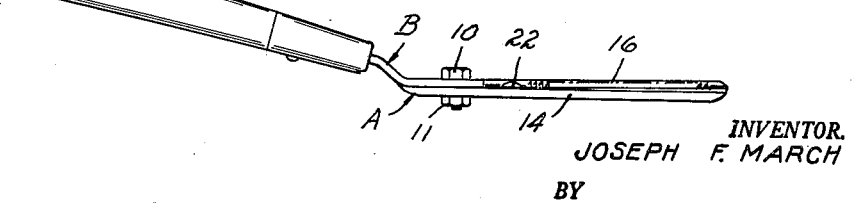
FIG. 3 is an edge view thereof with the blades shown in the position illustrated in FIG. 1.

It will be observed from FIGS. 1 and 2 that the blades are pivoted together by the bolt 10 at a point offset from the line of the cutting edge 20 of the blade A and towards or adjacent the rear edge thereof, whereas the line of the cutting edge of the blade B runs closely adjacent the pivotal point. This off-center pivotal arrangement imparts to the cutting action a slicing motion which is of considerable aid in reducing the energy required to make a cut. This arrangement is also an advantage as the slicing motion tends to retard the material being cut from moving forwardly during the cutting action.

Due to the off-center pivotal connection between the blades, the V-opening between the blades when they are in open position provides a "gathering area" which is materially more effective in gathering material to be cut and in keeping it from escaping the cutting action of the blade. The arrangement also provides for a wider gap or V-opening at the throat of the shears which increases the capacity thereof at this point. It will be observed from FIG. 2 that the top blade 16 is provided in its cutting edge 18 forwardly of the apex of the V-opening between the blades with a cutting notch 22 for the purpose of shearing larger individual branches, stems and the like. It has been found that with this arrangement careful aiming of the notch area at a single branch or the like is eliminated because the opened shears may merely be advanced to engage the branch within the gathering area in the apex or crotch between the blades where they cross and inwardly of the notch in the blade, and then when the blades are brought together, the branch is automatically guided forwardly by the blades into the notch and retained therein during the cutting operation.

Figure 4:
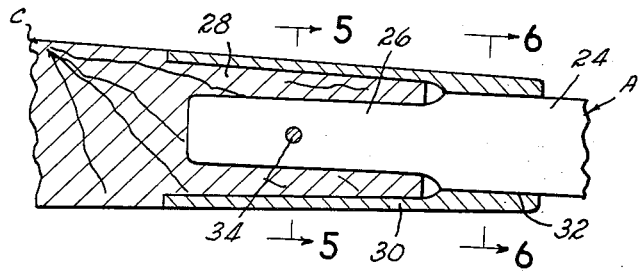
FIG. 4 is a central longitudinal cross-sectional view through the forward end of a handle and the ferrule associated therewith.
Figure 5:
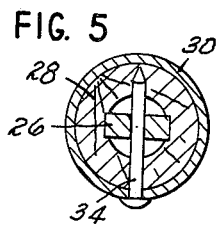
FIG. 5 is a cross-sectional view taken along line 5—5 of FIG. 4.
Figure 6:
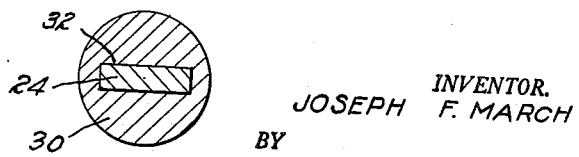
FIG. 6 is a cross-sectional view taken along the line 6—6 of FIG. 4.

Referring now to the improved connections between the handles and the butt ends of the respective blades, this arrangement is clearly illustrated in FIGS. 4, 5, and 6. As shown in FIG. 4, the butt end of the blade member has a flat extension or portion 24 from which rearwardly extends a tang 26 of lesesr width than said portion 24. The wooden handle C has conical portion 28 on its forward end which wedgedly fits within a correspondingly conical recess provided by a ferrule 30. The forward end of the ferrule for a substantial distance is solid except that it is provided with a generally rectangular shaped slot or opening 32 of generally the same cross-sectional shape and dimensions as the flat extension 24 so that the latter will very closely and snugly fit into this slot and thus prevent loose motion therebetween. The conical portion 28 of the handle is provided with a longitudinal bore of somewhat lesser diameter than the width of the tang 20 so that when the tang is driven into the bore, the side edges thereof are embedded in the periphery of the bore as shown in FIG. 5. A pin or nail 34 is employed to securely hold the ferrule, handle and tang in assembled relation. With this arrangement it will be seen that due to the metal-to-metal contact between the portion 24 and the walls of slot 32 and the close fit between the forward end of the handle and the ferrule, there is no sloppiness or looseness between these elements, and therefore chewing or fracturing of the wood of the handle ordinarily due to the shocks occurring when the blades are brought to their closed position during cutting actions is prevented.

As will be apparent to persons skilled in the art, various modifications and adaptations of the structure above described will become readily apparent without departure from the spirit and scope of the invention, the scope of which is defined in the appended claims.

I claim:

1. In a shrub shears, a top blade member and a bottom blade member, each of said members having a forwardly extending blade provided with a cutting edge along its inner edge, each of said members also having a rearwardly extending butt end, a pivot connecting said blades between said blades and butt ends for swinging movement between an open position and an overlapping position, and rearwardly extending handles on said butt ends, said top blade having a uniformly planar bottom surface with a straight cutting edge, said bottom blade being gradually curved upwardly along its longitudinal axis as it progresses towards its outer end and having a top surface transversely concave along an axis diverging and spaced from its cutting edge which continuously and gradually rises as it progresses forwardly whereby the successive points along said edge are progressively higher than corresponding points along the outside edge of the blade.

2. In a shrub shears, a top blade member and a bottom blade member, each of said members having a forwardly extending blade provided with a cutting edge along its inner edge, each of said members also having a rearwardly extending butt end, a pivot connecting said blades for swinging movement between an open position and an overlapping position and offset from a line of the cutting edge of one of said blades towards the rear edge thereof and adjacent the line of the cutting edge of the other blade, and handles secured to and rearwardly extending from said butt ends, said top blade having a uniformly planar bottom surface with a straight cutting edge, said bottom blade being gradually curved upwardly along its longitudinal axis as it progresses towards its outer end and having a top surface transversely concave along an axis diverging and spaced from its cutting edge which continuously and gradually rises as it progresses forwardly.

References Cited in the file of this patent

UNITED STATES PATENTS

| | | |
|---|---|---|
| 636,473 | Thuillier | Nov. 7, 1899 |
| 915,697 | Polley | Mar. 16, 1909 |
| 1,176,319 | Rose | Mar. 21, 1916 |
| 1,590,075 | Brenner | June 22, 1926 |
| 1,727,067 | Keefe | Sept. 3, 1929 |
| 1,827,149 | Heimerdinger | Oct. 13, 1931 |
| 2,010,576 | Whyte | Aug. 6, 1935 |
| 2,059,074 | Shyte | Oct. 27, 1936 |
| 2,105,332 | Rauh | Jan. 11, 1938 |
| 2,191,236 | McDonald | Feb. 20, 1940 |
| 2,558,697 | Vosbikian et al. | June 26, 1951 |
| 2,661,534 | Keiser | Dec. 8, 1953 |
| 2,679,096 | Wallace | May 25, 1954 |

FOREIGN PATENTS

| | | |
|---|---|---|
| 10,672 | Great Britain | of 1906 |
| 270,135 | Great Britain | May 5, 1927 |
| 732,299 | Great Britain | June 22, 1955 |